(12) United States Patent
Ulrich et al.

(10) Patent No.: US 10,073,528 B1
(45) Date of Patent: Sep. 11, 2018

(54) DEVICE AND METHOD FOR GENERATING A HAPTIC MOMENT AT AN ACTUATOR

(71) Applicants: VOLKSWAGEN AG, Wolfsburg (DE); AUDI AG, Ingolstadt (DE); ES-TEC GMBH, Wolfsburg (DE)

(72) Inventors: Dominik Ulrich, Wolfsburg (DE); Christoph Boese, Vechelde (DE); Peter Look, Wolfsburg (DE); Ulrich Müller, Ingolstadt (DE)

(73) Assignees: Volkswagen AG (DE); Audi AG (DE); ES-TEC GMBH (DE)

( * ) Notice: Subject to any disclaimer, the term of this patent is extended or adjusted under 35 U.S.C. 154(b) by 0 days.

(21) Appl. No.: 15/753,704

(22) PCT Filed: Aug. 18, 2016

(86) PCT No.: PCT/EP2016/069616
§ 371 (c)(1),
(2) Date: Feb. 20, 2018

(87) PCT Pub. No.: WO2017/032688
PCT Pub. Date: Mar. 2, 2017

(30) Foreign Application Priority Data

Aug. 27, 2015 (DE) .................. 10 2015 216 390

(51) Int. Cl.
*G08B 6/00* (2006.01)
*G06F 3/01* (2006.01)

(52) U.S. Cl.
CPC .............. *G06F 3/016* (2013.01); *G06F 3/011* (2013.01)

(58) Field of Classification Search
CPC . G06F 3/01; G06F 3/011; G06F 3/016; G06F 3/041; G08B 6/00; B60K 2350/1024
See application file for complete search history.

(56) References Cited

U.S. PATENT DOCUMENTS 6,504,278 B1 * 1/2003 Bald ...................... B06B 1/166
310/81
6,693,622 B1 * 2/2004 Shahoian ................ G06F 3/016
345/156

(Continued)

FOREIGN PATENT DOCUMENTS

DE 102006051593 A1 5/2007
DE 102006021593 A1 11/2007

(Continued)

OTHER PUBLICATIONS

Search Report for International Patent Application No. PCT/EP2016/069616, dated Nov. 29, 2016.

(Continued)

*Primary Examiner* — Van Trieu
(74) *Attorney, Agent, or Firm* — Barnes & Thornburg LLP

(57) ABSTRACT

A device for generating a haptic moment at an actuator including an unbalance motor, a sensor for sensing activation of the actuator, and a processor for generating an actuation signal for the unbalance motor depending on signals of the sensor, wherein the processor is embodied so that, when activation of the actuator is sensed, the processor generates a first actuation signal and generates a second actuation signal, wherein the first actuation signal is configured so the unbalance motor is accelerated in a first rotational direction without reaching more than two revolutions, and the second actuation signal is configured so the unbalance motor is braked without the unbalance motor starting to move in the second rotational direction.

10 Claims, 2 Drawing Sheets

(56) References Cited

U.S. PATENT DOCUMENTS 7,561,142 B2 * 7/2009 Shahoian ............... G06F 3/016
　　　　　　　　　　　　　　　　　　　　345/156
8,169,402 B2 * 5/2012 Shahoian ............... G06F 3/016
　　　　　　　　　　　　　　　　　　　　345/156

FOREIGN PATENT DOCUMENTS

| | | |
|---|---|---|
| DE | 102007058110 A1 | 6/2009 |
| DE | 102013001323 B3 | 3/2014 |
| KR | 20110060121 A | 6/2011 |
| KR | 20130114716 A | 10/2013 |
| KR | 20140020165 A | 2/2014 |
| WO | 2012121961 A1 | 9/2012 |
| WO | 2015049020 A1 | 4/2015 |

OTHER PUBLICATIONS

International Preliminary Report on Patentability for International Patent Application No. PCT/EP2016/069616, dated Feb. 27, 2018.
Office Action for Korean Patent Application No. 10-2018-7008154; dated May 2, 2018.

* cited by examiner

DEVICE AND METHOD FOR GENERATING A HAPTIC MOMENT AT AN ACTUATOR

PRIORITY CLAIM

This patent application is a U.S. National Phase of International Patent Application No. PCT/EP2016/069616, filed 18 Aug. 2016, which claims priority to German Patent Application No. 10 2015 216 390.3, filed 27 Aug. 2015, the disclosures of which are incorporated herein by reference in their entireties.

SUMMARY

Illustrative embodiments relate to a device and a method for generating a haptic moment at an actuator.

BRIEF DESCRIPTION OF THE DRAWINGS

Disclosed embodiments are described in detail below with reference to the drawing, in which.

DETAILED DESCRIPTION

Figure 1:
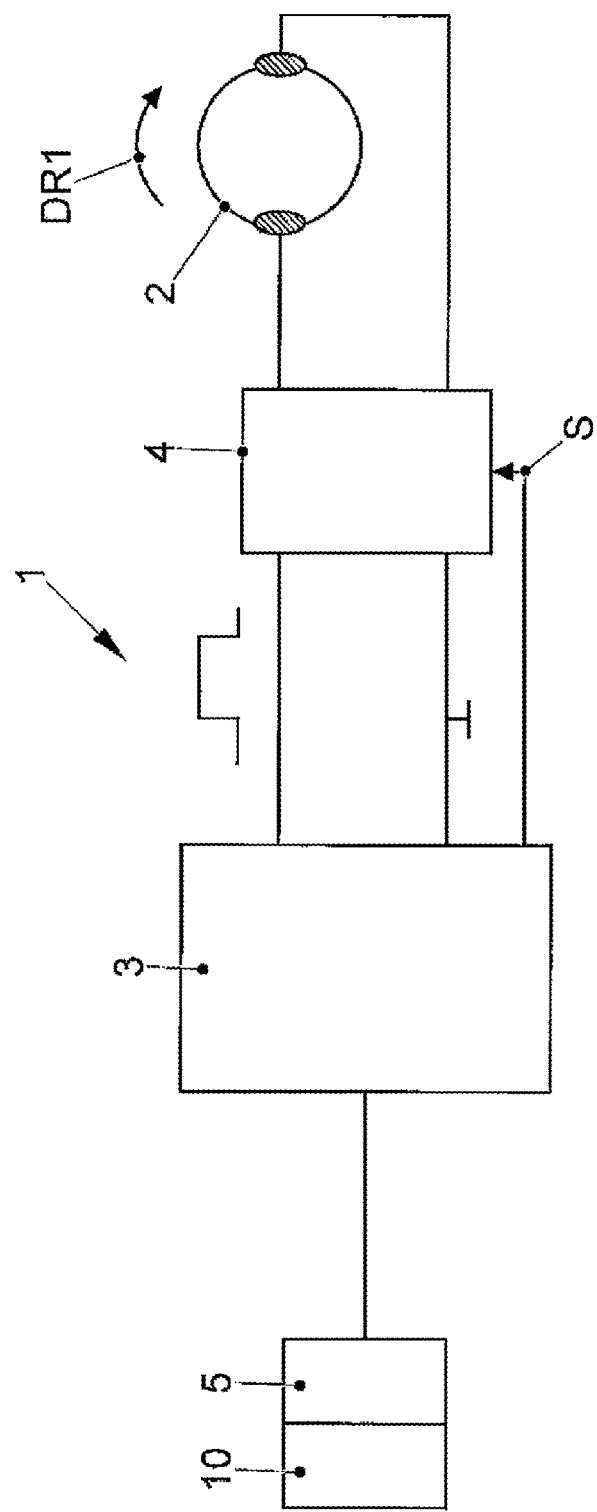
FIG. 1 shows a schematic block diagram of a device for generating a haptic moment.

Increasingly, actuators such as mechanical switches are being replaced by touch-sensitive switch surfaces. However, with these there is no haptic moment as feedback for the user. This can result in the user being uncertain as to whether the operation of the actuator was successful.

Vibration devices are known in various embodiments for alerting a user. An unbalance motor, which is embodied, for example, as a stepper motor, is a very compact and inexpensive design of a vibration device. Such a vibration device is, for example, described in DE 10 2013 001 323 B3.

Vibrations as a haptic moment at actuators are however usually undesirable, because they do not correspond to the expected feedback.

Disclosed embodiments are based on the technical problem of providing a device for generating a haptic moment at an actuator that is compact and inexpensive and produces an essentially pulse-shaped moment. A further technical problem is that of providing a suitable method for generating a haptic moment.

The solution of the technical problem arises as the disclosed device and the disclosed method.

For this purpose, the device comprises an unbalance motor for generating a haptic moment at an actuator, a sensor for detecting the actuation of the actuator and a processor for producing an actuation signal for the unbalance motor depending on signals of the sensor. In this case, a driver may be disposed between the processor and the unbalance motor to convert the actuation signals into power. The processor is embodied such that on detecting the operation of the actuator a first actuation signal and a temporally offset second actuation signal are produced. In this case, the first actuation signal is designed such that the unbalance motor is accelerated in a first direction of rotation without achieving more than two revolutions. Immediately following the first actuation signal or without a noticeable delay, the second actuation signal is produced, which is designed such that the unbalance motor is decelerated without the unbalance motor running in the second direction of rotation. This produces an almost pulse-shaped moment, wherein the inexpensive and compact unbalance motor can be used.

The first actuation signal may be embodied such that no more than one revolution is reached in the first direction of rotation. Because the unbalance motors have different frictional torques depending on the initial position, the first actuation signal is designed such that it brings about exactly one revolution or slightly less in the position with the greatest frictional torque. The configuration can be carried out in advance by using test measurements.

In a further disclosed embodiment, the processor is embodied such that when the operation ends, further first and second actuation signals are produced. In principle, the further first and second actuation signals can be identical, as with the first and second actuation signals during actuation. However, the further first actuation signal may be implemented such that the acceleration in the first direction of rotation is less than during actuation of the actuator. As a result, the haptic moment is also smaller, which corresponds more closely to the feel of a conventional switch.

In a further disclosed embodiment, the sensor is embodied as a pressure sensor. In principle, other sensors, such as, for example, proximity sensors, also come under consideration.

In a further disclosed embodiment, the drive signals are implemented as PWM signals, by which the revolution rate and hence the acceleration are controlled.

In at least one disclosed embodiment, the haptic moment produced is independent of how large the actuation pressure is that the pressure sensor detects, as long as the pressure only exceeds a threshold value.

Alternatively, the processor can be embodied so that the acceleration in the first direction of rotation is set as a function of the detected pressure value at the pressure sensor, optionally being increased for increased pressure values.

In a further disclosed embodiment, the processor is embodied such that the number of the first and second actuation signals is selected depending on the detected pressure value at the pressure sensor. Instead or in addition, this can also depend on the operating time.

In a further disclosed embodiment, the unbalance motor is operated in overload, so that still greater accelerations can be achieved.

Reference can be made to the preceding remarks regarding comprehensive procedural instructions.

An application area is in a transportation vehicle, for example, in a steering wheel of a transportation vehicle.

The device 1 for generating a haptic moment at an actuator 10 comprises an unbalance motor 2, a processor 3, a driver 4 and a pressure sensor 5. The pressure sensor 5 is connected to the processor 3 and analyses whether the actuator 10 is being actuated or pressed. For this purpose, for example, a check is carried out as to whether a pressure signal of the pressure sensor 5 exceeds a threshold value. Then the processor 3 produces a first actuation signal S1(D) and a second actuation signal S2(D), which are amplified by the driver 4 and fed to the unbalance motor 2. The actuation signals S1(D), S2(D) are PWM signals here, optionally 100% PWM signals. In this case, the revolution rate at which the unbalance motor 2 runs can be adjusted by the % value of the PWM signals. The higher the PWM value, the higher is the revolution rate or the acceleration in a direction of rotation. By a control input S, the actuation signal at the driver 4 can be inverted, so that the direction of rotation of the unbalance motor 2 is changed.

Figure 2A:
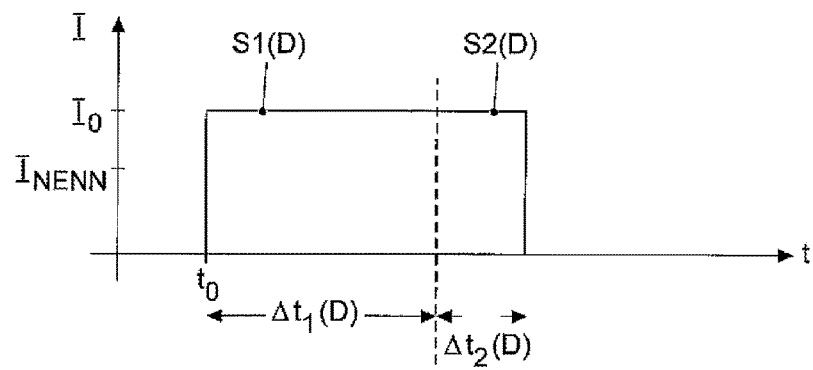
FIG. 2a shows a current profile of the actuation signals when actuating the actuator.
Figure 2B:
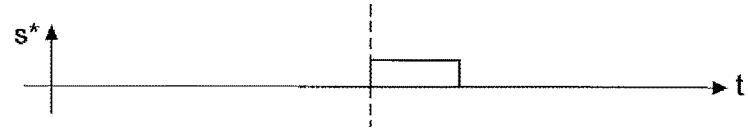
FIG. 2b shows a profile of a changeover signal at the driver when actuating the actuator.

Using FIGS. 2a and 2b, the actuation of the unbalance motor 2 by pressing D the actuator 10 at the point in time t0 is described. In FIG. 2a, the amplified first actuation signal S1(D) and the amplified second actuation signal S2(D) are represented after the driver 4, wherein the shape of the actuation signals from the processor 3 is of the same form, only having different current values. The two actuation signals S1(D), S2(D) are each 100% PWM signals with an amplitude I0, which is greater than a rated current INENN of the unbalance motor 2. Because of the increased amplitude, the unbalance motor 2 acceleration is still greater. In this case, the time duration $\Delta t1(D)$ is selected relative to the amplitude I0 such that after the expiry of the time duration $\Delta t1(D1)$, the unbalance motor 2 has at most completed a full revolution in a first direction of rotation DR1 (see FIG. 1). The greater I0 is selected, the smaller must $\Delta t1(D)$ be selected and vice-versa. Then the second actuation signal S2(D) is produced to decelerate the unbalance motor 2, without the motor running in the opposite direction from DR1. For this purpose, the processor produces a changeover signal s* at the control input S, so that the current flow in the unbalance motor 2 is inverted. The second actuation signal S2(D) is also a 100% PWM signal, wherein however the time duration $\Delta t2(D)$ is shorter than $\Delta t1(D)$. In this case, the time duration $\Delta t1(D)$ may be less than 30 ms, or optionally may be less than 20 ms. The time duration $\Delta t2(D)$ may be less than 20 ms, or optionally may be less than 10 ms.

Owing to the strongly accelerated run-up and deceleration of the unbalance motor 2, a single haptic pulse is produced during this, where the magnitude of the moment is a function of the product of I0 and $\Delta t1(D)$.

During termination of the actuation or release L of the actuator 10, a haptic moment should also be produced, but this should be smaller than during the actuation.

Figure 2C:
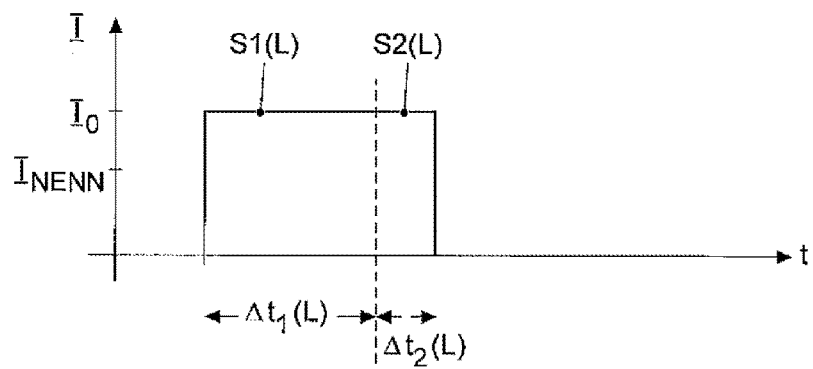
FIG. 2c shows a current profile of the actuation signals when ending the actuation of the actuator.
Figure 2D:
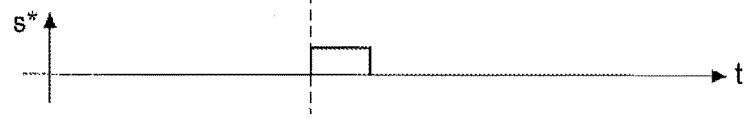
FIG. 2d shows a profile of a changeover signal at the driver when ending the actuation of the actuator.

Therefore, as is represented in FIGS. 2c and d, the time duration $\Delta t1(L)$ of the first actuation signal S1(L) is selected to be shorter compared to $\Delta t1(D)$. Accordingly, the time duration $\Delta t2(L)$ for the second actuation signal S2(L) for deceleration is selected to be shorter. Alternatively, the time durations $\Delta t1$, $\Delta t2$ can remain the same and I0 can be reduced.

The invention claimed is:

1. A device for generating a haptic moment at an actuator, the device comprising:
   an unbalance motor;
   a sensor for detecting actuation of the actuator; and
   a processor for producing an actuation signal for the unbalance motor depending on signals of the sensor, wherein the processor produces a first actuation signal and a second actuation signal on detecting actuation of the actuator, wherein the first actuation signal (S1(D)) is designed so the unbalance motor is accelerated in a first direction of rotation without achieving more than two revolutions, wherein the second actuation signal is designed so the unbalance motor is decelerated without the unbalance motor running in the second direction of rotation.

2. The device of claim 1, wherein the first actuation signal is designed so the unbalance motor achieves no more than one revolution in the first direction of rotation.

3. The device of claim 1, wherein, during termination of the actuation, the processor produces a further first and second actuation signal.

4. The device of claim 3, wherein the further first actuation signal is implemented so the acceleration in the first direction of rotation is smaller than during the actuation of the actuator.

5. The device of claim 1, wherein the sensor is a pressure sensor.

6. The device of claim 5, wherein the processor is embodied so the acceleration in the first direction of rotation is adjusted as a function of the detected pressure value at the pressure sensor.

7. The device of claim 5, wherein the processor is embodied so the number of first and second actuation signals is selected depending on the detected pressure value at the pressure sensor.

8. The device of claim 1, wherein the actuation signals are PWM signals.

9. The device of claim 1, wherein the actuation signals are implemented so the unbalance motor is operated in overload.

10. A method for generating a haptic moment at an actuator, by an unbalance motor, a sensor for detecting actuation of the actuator and a processor for producing an actuation signal for the unbalance motor, wherein the sensor detects actuation of the actuator and transmits to the processor, wherein the processor produces a first actuation signal, by which the unbalance motor is accelerated in a first direction of rotation without achieving more than two revolutions, wherein following the first actuation signal the processor produces a second actuation signal, by which the unbalance motor is decelerated without running in the second direction of rotation.

* * * * *